July 18, 1933.  A. F. FREDRICKSEN  1,918,258
DEVICE FOR TESTING CARBONATED BEVERAGE
Filed Sept. 11, 1930
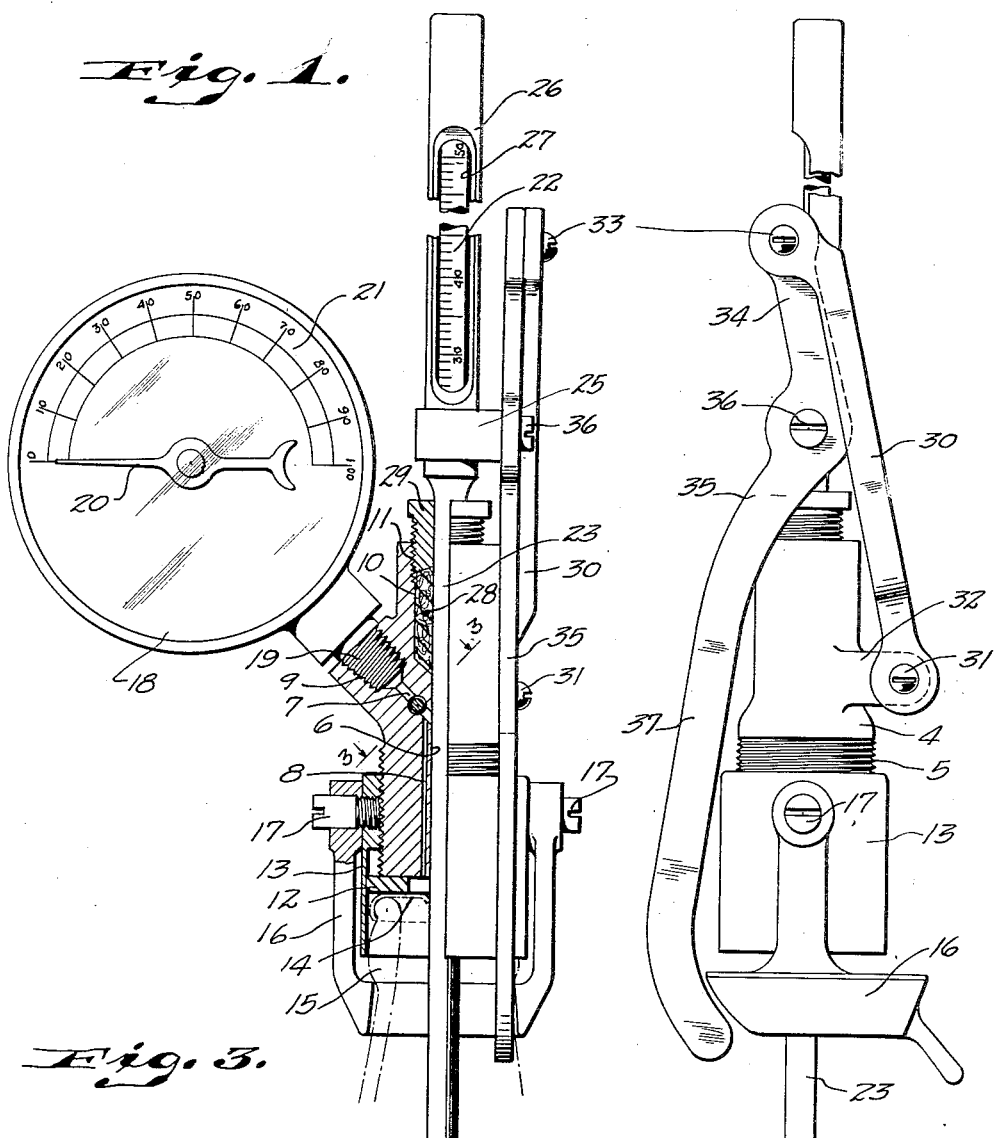
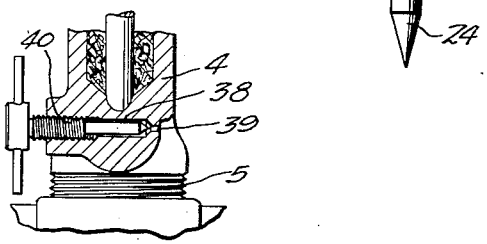
INVENTOR
Arthur F. Fredricksen
BY
Louis O. French
ATTORNEY Patented July 18, 1933

1,918,258

UNITED STATES PATENT OFFICE

ARTHUR F. FREDRICKSEN, OF WAUKESHA, WISCONSIN

DEVICE FOR TESTING CARBONATED BEVERAGES

Application filed September 11, 1930. Serial No. 481,115.

The invention relates to a device for use in ascertaining the gas volume of carbonated beverages.

Heretofore in the testing of carbonated beverages for gas volume it has been customary to take temperature and pressure responsive readings with separate instruments, and with this data compute the gas volume. This procedure takes time and because there is an interval between these readings occasioned by the shifting of one instrument to the other, the data is not fully accurate as the computations for gas volume based on temperature and pressure are dependent upon the securing of this data at substantially the same time or under the same conditions. The object of the present invention is to overcome the above mentioned disadvantages by providing an apparatus in which the temperature and pressure may be obtained at substantially the same time and obtained from a sample bottle of the beverage that has been previously capped as distinguished from the structure of my co-pending application Serial No. 459,519, filed June 6, 1930, wherein the apparatus was used on an uncapped bottle.

The invention further consists in the several features hereinafter set forth and more particularly defined by claims at the conclusion hereof.

In the drawing, Fig. 1 is a front elevation view of device embodying the invention, parts being broken away and parts being shown in section;

Fig. 2 is a side elevation view of the device;

Fig. 3 is a detail sectional view taken on the line 3—3 of Fig. 1.

Refering to the drawing, the numeral 4 designates a casing or cap member having a threaded portion 5, a centrally disposed bore 6, an angularly disposed passage 7 communicating with a small passage 8 and with a threaded bore 9, and an enlarged bore 10 communicating with the upper end of the bore 6 and having a threaded upper end 11. A packing ring 12 is adapted to abut against the lower face of the casing 4 and to fit within the lower end of a sleeve 13 whose upper end is in threaded engagement with the threaded end 5 of the casing 4. This packing ring is held in tight sealing engagement with the cap 14 on the mouth of the bottle 15 by a suitable clamping means such as the forked clamping lever 16 which is pivotally mounted on the trunnion screws 17 that are carried in the upper end of the sleeve 13, said lever adapted to cooperate with the mouth of the bottle when swung inwardly over the same to clamp the packing ring 12 in sealed engagement with the cap 14.

A pressure gauge 18 has its threaded end 19 in fluid-tight threaded engagement with the threaded bore 9 and is provided with the usual pointer 20 and the scale 21. The gases to be tested are free to pass through the bores 8 and 7 and the lower end of the bore 9 to the interior of the gauge. A thermometer 22 has its lower end including the bulb, encased in a tubular metallic sheath 23 having a pointed or cap-piercing end 24, this sheath is so arranged with relation to the glass thermometer tube within it as to have good thermal conductive relation therewith as by the use of a mercury bath between the sheath and the glass tube of the thermometer which is sealed within the sheath adjacent the exposed end of the thermometer, this manner of securing a good thermal contact between the thermometer and the sheath being known so that further description and showing is deemed unnecessary. The sheath 23 is secured to a support 25 of metal to which the guard 26 for the upper end of the thermometer is also secured, said guard having the cut-out portion 27 to expose the thermometer for reading. The sheath 23 is mounted to slide within the bore 6 and is sealed against the escape of gases from the bottle by a suitable non-metallic packing gland 28 mounted in the enlarged bore 10 and engaged by the end of the threaded sleeve nut 29.

For moving the thermometer and its piercing sheath so as to pierce the cap and bring the lower end into the contents of the bottle for the purpose of getting a temperature reading and for thereafter removing the thermometer from the bottle, a toggle mechanism is provided associated with the casing 4 and the support 25.

The mechanism includes a toggle link 30 pivotally mounted at 31 on a lug 32 associated with the casing 4 and pivotally mounted or pivotally connected at its other end by a pin 33 connected with the outer end of the arm 34 of a lever 35 which is pivotally mounted intermediate its ends on a screw or other suitable pivot pin 36 carried by the support 25. With this construction the relation of the link 30 and the lever 35 is such that a relatively long travel of the thermometer relative to the casing 4 is obtained and the pressures produced by the piercing imposed by the toggle mechanism upon the thermometer assembly during the piercing operation are directed lengthwise of the thermometer assembly and hence do not impose side thrusts on the thermometer to interfere with its easy and repeated movements through the guide bore in the casing under conditions of use.

With the above construction the device may be applied to a previously capped bottle of a beverage whose gas content is to be tested, by the affixing of the same thereto in the manner described in connection with the explanation of the function of the lever 16, the thermometer then being in a raised position and the lower operating end 37 of the lever 35 being also in a raised position. Thereafter as the operator pushes the end 37 of the lever downwardly to the full line position shown in Fig. 2, the toggle linkage above described will operate to force the pointed end 29 of the thermometer through the metal cap 14 on the bottle and thus pierce a hole in the same and be moved down into the contents of the bottle so that that lower end of the thermometer itself which is within the sheath will be in proper thermal conductive relation with the contents of the bottle so that a temperature reading may be had. Before taking this reading, however, it is necessary to relieve the bottle of what is called a "false gas pressure" which would under these circumstances be registered by the gauge 18 due to the pressure of free gas above the contents of the bottle occasioned by its standing, and for this purpose a transverse passage 38 is provided in the casing 4 that communicates with the passage 7 and with a bleed passage 39 controlled by a needle valve 40 suitably mounted for adjustment and movement in the casing 4 into and out of closed position with the bleed orifice 39. Thus after the bottle's cap is pierced by the thermometer, the valve 40 is momentarily opened to allow the pressure of the gases in the bottle which are then existing and known as "false pressures" to be dissipated so that the gauge registers zero and then the valve 40 is closed and thereafter the contents of the bottle are shaken up and the operator may then obtain his data necessary for the computation of the gas volume by taking the reading of the pressure on the gauge 18 and the temperature registered by the thermometer 22 at substantially the same time and he can then compute the gas volume in the usual manner from this data.

I desire it to be understood that this invention is not to be limited to any particular form or arrangement of parts except in so far as such limitations are included in the claims.

What I claim as my invention is:

1. In a device for obtaining data for the gas volume determination of carbonated beverages, the combination of a casing, means for detachably securing said casing in fluid-tight engagement with the capped mouth of a bottle, a thermometer for measuring the temperature of the beverage, a sheath, in which the lower end of said thermometer is mounted, movably mounted in said casing, said sheath having means to pierce the cap on the bottle, said casing having a passage, a pressure gauge connected with said casing and communicating through said passage and through the pierced cap with the interior of the bottle whereby readings of the temperature and gas pressure of the contents of the bottle are obtainable at substantially the same time and under substantially the same condition of the contents of the bottle, and means for moving said thermometer with said sheath, relative to said casing, into and out of operative relation with the contents of the bottle.

2. In a device of the character described, the combination of a casing, means for detachably securing said casing in fluid-tight engagement with the capped mouth of a bottle, a thermometer, a sheath for said thermometer slidably mounted in said casing and provided with a cap-piercing end, and toggle mechanism carried by the casing and connected with said sheath for moving said thermometer and its sheath, relative to said casing, into and out of operative relation with the contents of the bottle, said casing having a passage, and a pressure gauge mounted on said casing and communicating through said passage and through the pierced cap with the interior of the bottle whereby readings of the temperature and gas pressure of the contents of the bottle are obtainable at substantially the same time and under substantially the same conditions of the contents of the bottle.

3. In a device of the character described, the combination of a casing, means for detachably securing said casing in fluid-tight engagement with the capped mouth of a bottle, a thermometer, a sheath for said thermometer slidably mounted in said casing and provided with a cap-piercing end, a lever pivotally mounted on said sheath, and a toggle link connecting said lever with the casing for moving said thermometer and sheath, relative to said casing, into and out of operative relation with the contents of the bottle, said casing having a passage, and a pressure gauge mounted on said casing and communicating through said passage and through the pierced cap with the interior of the bottle whereby readings of the temperature and gas pressure of the contents of the bottle are obtainable at substantially the same time and under substantially the same conditions of the contents of the bottle.

ARTHUR F. FREDRICKSEN.